United States Patent Office 3,272,297
Patented Sept. 13, 1966

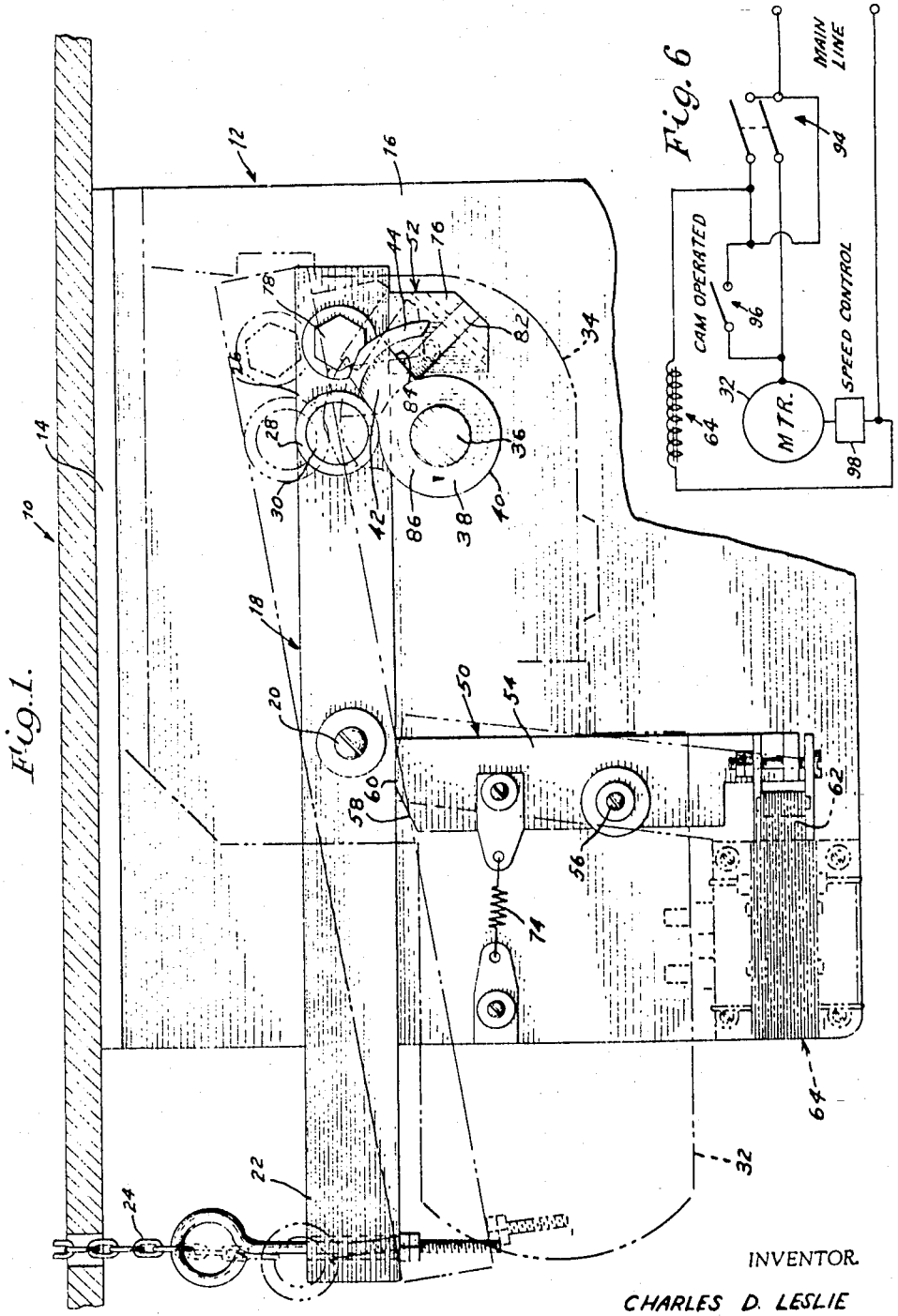

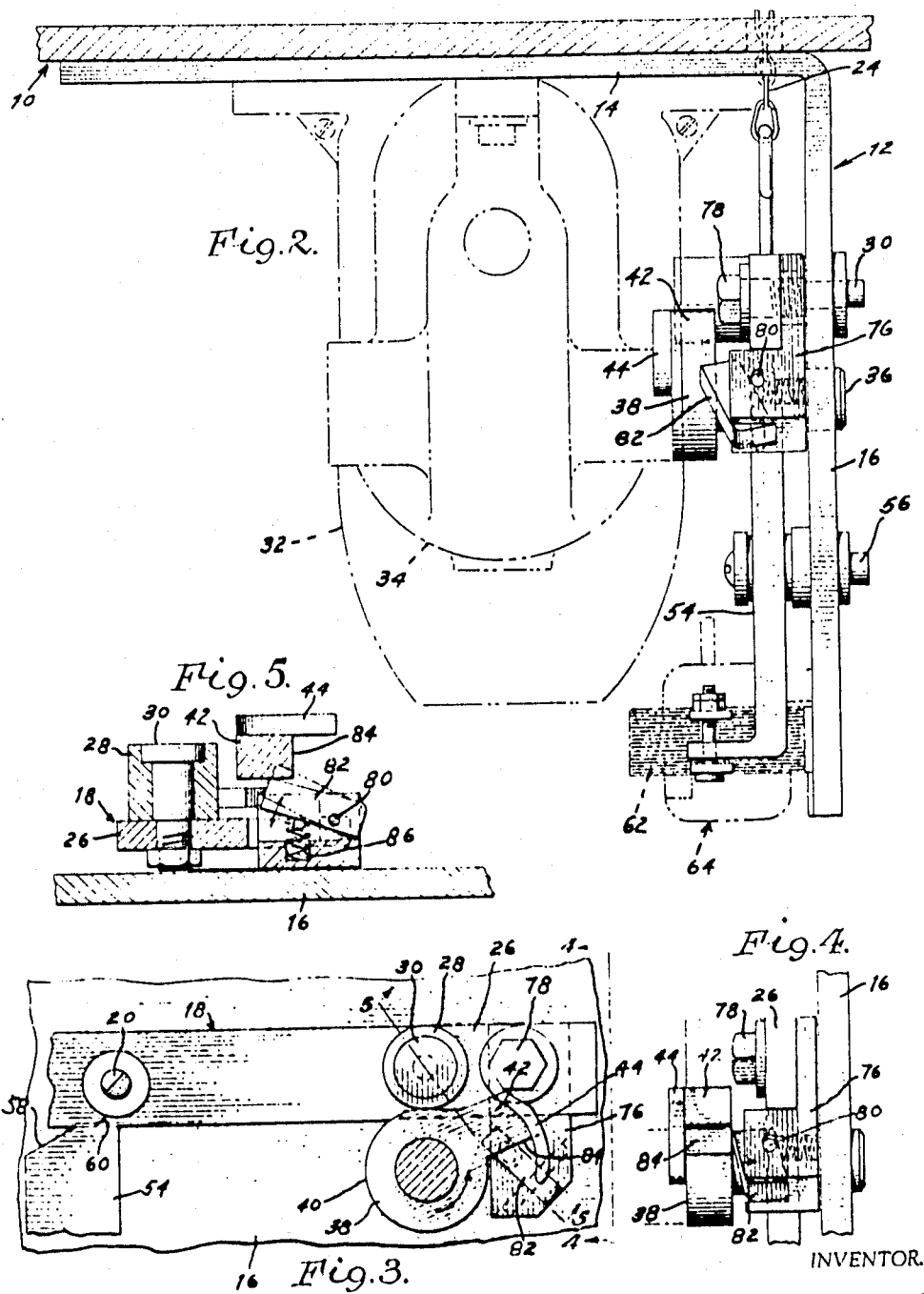

3,272,297
STOP FOR CONTROL OF BUTTON SEWING MACHINE
Charles D. Leslie, Pittsford, N.Y., assignor to Speed Feed Machine Co., Rochester, N.Y.
Filed Sept. 9, 1964, Ser. No. 395,248
2 Claims. (Cl. 192—139)

This invention relates to actuator devices and pertains, more particularly, to a remotely controlled mechanical actuator which may be used in a system to supplant manual actuation.

In numerous mass production operations, the actuation of a machine or machine element is performed manually and although operators may develop great skill and speed in the manipulation thereof, repetitive and constant usage during a normal working shift obviously introduces a fatigue factor which might be largely eliminated if the muscle load were materially reduced as by providing a remotely controlled mechanical actuator for performing the same task. It is to this end that the present invention is directed. However, the very nature of the problem dictates that certain requirements be met which are essentially antagonistic to each other so that successful solution of the problem is not an easy task. For example, the time delay between the performance of the remote controlling action and the actual operation of the device should be minimized so as not to slow down the operator's normal rate of production. At the same time, the device should be of such simple and efficient nature that it may not only perform its function repetitively for sustained periods of time without the probability of requiring any substantial degree of maintenance or adjustment but also lend itself to economical production. Ordinarily, these two requirements are mutually exclusive. Still further, the problem is augmented by the fact that the mechanism should be capable of cyclic or continuously repetitive action which may be varied as to frequency to accommodate for the differences in skills of different workers, ranging from a beginner to the most highly skilled operator. It is of primary concern in connection with the present invention to fulfill all of the above requirements and to do so by means of a mechanism which is, at the same time, of economical construction.

A further object of this invention is to provide a remotely controlled actuator device which consists essentially of the combination between a pivoted lever, a cam which may be operated either for a single cycle or for successive cycles of operation at the will of the operator to impart rocking motion to the lever, means for indexing the cam mechanism at the termination of each operation to a position in which a minimum clearance is established between the cam mechanism on the lever, and means for capturing and holding the cam mechanism in the indexed positioned.

Still another object of this invention resides in the combination, in an actuator device, of a pivoted lever operated by cam means in which compound locking means cooperate with switch means actuated by the cam means and with the cam means to effect indexing of the cam means and to hold such indexed position of the cam means for minimizing response time of the mechanism.

Other objects and advantages of the invention will appear from the description hereinbelow and the accompanying drawing wherein:

FIG. 1 is an elevational view of the actuator device constructed in accordance with this invention showing the cam mechanism in its indexed position, the motor and gear head assembly being illustrated in phantom lines for the purpose of clarity;

FIG. 2 is an end view of the assembly shown in FIG. 1;

FIG. 3 is a partial section illustrating the cam and its association with the lever just prior to attainment of the indexed position;

FIG. 4 is a sectional view taken along the plane of section line 4—4 in FIG. 3 illustrating the disposition of the locking dog during operation of the lever;

FIG. 5 is a horizontal section taken along the plane of section line 5—5 in FIG. 3 and showing further details of the locking dog;

FIG. 6 is a diagrammatic view illustrating the circuitry involved in association with the present invention.

With reference at this time more particularly to FIGS. 1 and 2, the reference numeral 10 therein indicates in general the bed or table of a machine to be controlled in association with the actuator member described herein. A support frame indicated generally by the reference character 12 is secured, in the particular case shown, to the underside of the table 10 and includes a horizontal leg portion 14 and a vertically depending leg portion 16, the latter of which serves to mount, as is shown best in FIG. 1, an actuating lever assembly indicated generally by the reference character 18. For this purpose, the actuating lever 18 is pivotally mounted to the vertical leg 16 by means of a pivot bolt or suitable equivalent assembly 20 which may take any convenient or desired form. The free end 22 of the lever 18 is connected, in the specific instance shown, to a chain member 24 which will serve to actuate the associated mechanism mounted on the table 10. A specific application of the mechanism herein disclosed may be associated with a conventional button sewing machine in which the chain 24 is normally connected to a treadle manually depressed by the operator to manipulate the associated clutches and the like of the button sewing machine to initiate a sewing cycle of the machine. Such a button sewing machine can be manipulated, by a skilled operator, to effect the sewing of as many as 14,500 buttons in an eight hour shift. The force required, at the treadle, to actuate such machines will be in the order of 17–25 pounds. From this, it will be readily apparent that the physical operation of depressing the treadle for tensioning the chain 24 and operating the mechanism to which it is attached may introduce a considerable fatigue factor insofar as the machine operator is concerned. As will hereinafter be more particularly pointed out, according to the present invention, the lever 18 is caused to rock about the pivot 20 under control of the operator, requiring only that the operator depress a suitable foot switch for initiating such operation.

The opposite end 26 of the lever 18 mounts a cam roller 28, the same being pivotally mounted on the end portion 26 of the lever 18 by means of a suitable stub shaft or the like 30. Mounted on the underside of the horizontal arm 14 of the support frame or otherwise suitably secured to the frame assembly of the device is a motor 32 and an associated gear reduction head 34 which, for the purpose of clarity, are shown in dotted lines in FIGS. 1 and 2. This motor-gear reduction head assembly may be of any conventional construction or form such as are readily available as for example, in a combined unit. Projecting from the gear reduction head is a drive shaft 36 and cam means 38 is mounted on this drive shaft for cooperation with the cam roller 28 on the lever 18 to rock the lever about its associated pivot 20, as aforesaid. The cam means includes a cam proper having a heel portion 40 concentric with the axis of the drive shaft 36 and a cam nose portion 42 which operates to engage the cam roller 28 and rock the lever 18 to the dotted line position shown in FIG. 1. In the specific embodiment shown, there may be also provided an additional cam element 44 which does not contact the roller 28 but which operates an associated switch 96 (see FIGURE 6) which for the sake of clarity is not shown in FIGURES 1–4.

Of primary importance in connection with the present invention is the provision of means for first bringing the drive shaft 36 and its associated cam means 38 to an indexed position and then capturing and holding the cam means in such indexed position so that at the end of each actuation cycle, the cam means is so positioned that the toe portion 42 of the cam is in position to immediately initiate another rocking action of the lever 18 as soon as the drive shaft 36 starts to rotate. In this fashion, lost motion is largely obviated and response time of the assembly is minimized. The particular manner in which this is accomplished is by the combination of the locking bar assembly indicated generally by the reference character 50 and the locking dog mechanism indicated generally by the reference character 52. The locking bar consists of a lever 54 pivoted as at 56 to the support frame and having an upper end provided with a sloping portion 58 and a flat nose portion 60. In the position of the components as shown in FIG. 1, the flat nose portion 60 of the locking bar is positioned on the far side of the pivot 20 relative to the cam roller 28 so that, in effect, the lever 54 blocks any rocking action of the lever 18 and thus, in effect, forms a brake or lock for the component parts in this position. The lower end of the lever 54 is provided with suitable means for connection to the armature 62 of a solenoid device indicated generally by the reference character 64. When the solenoid 64 is actuated, the armature 62 thereof moves to the left in FIG. 1, and moves the lever 54 to the dash-dot line position for this lever as is also shown in FIG. 1, thus clearing the lever 18 of blocking action as normally effected by the lever 54, allowing the sloped end portion 58 to permit the lever 18 to rock as is shown in dot-dash lines in FIG. 1.

In order to return the locking bar 50 to its normal position for proper disposition relative to the actuating lever 18 when the solenoid 64 is deenergized, a suitable spring means such as the tension spring 74 may be provided.

The above described mechanism, excepting the locking dog mechanism 52, is identical in principle to the corresponding mechanism described in my copending application Serial No. 360,904, filed April 20, 1964.

With reference now to FIG. 5, the foot switch which is under control of the operator is indicated generally therein by the reference character 94 and it will be seen that whenever this switch is closed as by momentary depression of an associated foot treadle, the motor 32 and the solenoid 64 will simultaneously be energized. This action will cause the locking bar 50 to be moved to the dash-dot line position shown in FIG. 1 to permit rocking of the lever 18 and, at the same time, the drive shaft 36 will rotate in the direction of the arrow 86 in FIG. 1 to immediately cause rocking action of the lever 18. During operation, the operator will immediately release the foot switch but in the interim, the cam portion 44 has ridden past the follower 28 and the switch 96 is closed so as to maintain a closed condition to the motor 32 although, as soon as the foot switch 94 is released, the solenoid 64 will be deenergized, thus permitting the spring 74 to return the locking bar to the full line position shown in FIG. 1 whenever the rocking motion of the lever 18 has been completed.

Thus, the motor 32 will continue to operate until the switch 96 is opened by the cam 44, whereafter the drive shaft 36 and associated cam 38 will coast as aforesaid until reaching the index position wherein further motion is blocked by the blocking bar 54. Additionally, the control conduit for the assembly preferably includes a speed control 98 which establishes the speed of operation of the motor 32. This is desirable since repetitive cycles may be called for in which case the operator merely maintains the foot switch 94 depressed for a sufficiently long period so as to achieve the requisite number of actuating cycles. It is obvious that the frequency of actuations which may occur during such cycles of successive actuations will be less for an unskilled operator than that which a skilled operator can utilize and, for this reason, the speed control 98 is provided. Thus, the speed control will accommodate for any particular operator, taking into account the operator skill involved, the switch 96 being correspondingly adjusted, as may be required. In any case, it is imperative that the switch 96 be adjusted or alternatively that the cam portion 44 be so provided as to interrupt power to the motor 32, during single cycle operation so as to assure attainment of the proper indexed position of the cam whenever a single cycle or a succession of cycles is terminated.

The switch 20 is normally closed except when the cam portion 44 is disengaged therefrom to permit the switch to move to its open position, at which time the switch interrupts power to the motor 32, provided that the attendant operated foot switch is not closed. Thus, it will be apparent that the switch 20 will be opened at some time prior to the rotational attainment of the drive shaft 36 to its indexed position as shown in FIG. 1 so that the drive shaft and associated cam means 38 will be coasting prior to engagement of the cam in the indexed position as aforesaid. This coasting action together with the blocking action of the locking bar 50 will serve to permit the cam to attain the indexed position thereof without undue shock or loading on the component parts of the mechanism, and especially on the gear train within the gear reduction head portion 34 of the assemblage. To this end, the switch 20 is permitted of adjustment relative to the cam 44, i.e. the switch may be disposed to be actuated earlier or later with respect to the indexed position of the cam as may be necessitated by a particular operating condition of the device.

As the cam reaches the indexed position, the locking dog mechanism 52 comes into play to capture and hold the cam in indexed position, thereby eliminating the possibility of excessive free play as might be caused by rebound of the cam. The locking dog mechanism consists of a suitable mounting member 76 fixed, as by the fastener 78, to the end portion 26 of the lever 18 and pivoted to this member 76 by means of the pin 80 in the locking dog 82 which is adapted to engage behind and against the rear surface 84 of the cam and thus hold it in the indexed position against any rebound action which might otherwise take place. The dog 82 is normally projected to its operative position by means of the compression spring 86 seated in the mounting member 76 as shown in FIG. 5. The existence of rebound is particularly apt to occur when the actuating mechanism is operated at high cycle speed. In regard to this, the motor 32 is preferably capable of being controlled as to speed so as to accommodate for the skill of the particular operator involved. It will be understood, of course, that the locking dog 82 and the cam surface 84 are so related as to minimize any "free play" in the mechanism when the cam is indexed, as in FIG. 1. That is to say, the cooperative actions of the mechanisms 50 and 52 are such that the cam when indexed is held very close to or against the roller 28 and thereby in readiness to immediately commence motion of the lever 18 as soon as the motor 32 is energized.

By using the electrical circuit of my copending application, whenever the foot treadle switch is closed as by momentary depression thereof, the motor 32 and the solenoid 64 will simultaneously be energized. This action will cause the locking bar 50 to be moved to the dash-dot line position shown in FIG. 1 to permit rocking of the lever 18 and, at the same time, the drive shaft 36 will rotate in the direction of the arrow 86 in FIG. 1 to immediately cause rocking action of the lever 18. Alternatively, the electrical circuit may be constructed so as to sequentially operate the solenoid 64 and the motor drive to the shaft 36 in order to accrue unlocking movement of the bar 50 before the motor is energized. During operation, the operator may immediately release the foot treadle switch but in the interim, the cam portion 44 will have disengaged its associated switch to thereby maintain the energized condition of the motor 32 although, as soon as the foot treadle switch is released, the solenoid 64 will be deenergized, thus permitting the spring 74 to return the locking bar to the full line position shown in FIG. 1 whenever the rocking motion of the lever 18 has been completed.

Thus, the motor 32 will continue to operate until the switch associated with the cam 44 is reengaged, whereafter the drive shaft 36 and asosciated cam 38 will coast as aforesaid until reaching the indexed position wherein further motion in the direction of arrow 86 is blocked by the blocking bar 50. At the same time, the locking dog 82 will have engaged behind the cam surface 84 to prevent rebound and hold the indexed position of the cam.

It is to be understood that certain changes and modifications as illustrated and described may be made without departing from the spirit of the invention or the scope of the following claims.

I claim:
1. In a remotely controlled actuator device, in combination,
   a support frame and having a cam engaging member thereon,
   an actuating lever pivotally mounted on said frame,
   a drive assembly mounted on said frame and including a drive shaft,
   cam means on said drive shaft and engaging said cam engaging member for rocking said lever about its pivot in response to rotation of said drive shaft,
   means for indexing said drive shaft to a position in which said cam means is at the initiation of lever rocking action, such means including a locking bar normally engaging said lever for blocking rotation of said drive shaft beyond the indexed position thereof, and locking dog mechanism carried by said lever and spaced from said cam engaging member to normally hold said cam means captive therebetween for blocking rebound motion of said cam means,
   and mechanism for moving said locking bar out of blocking engagement with said actuating lever.

2. In a remotely controlled actuator device, in combination,
   a support frame,
   an actuating lever pivotally mounted on said frame,
   a rotatable cam assembly for rocking said actuating lever,
   drive means for rotating said cam assembly,
   and control means for indexing and holding said cam assembly in position to initiate immediate actuating lever rocking action subsequent to deenergization of said drive means said control means comprising a blocking lever pivoted on said frame for movement into and out of blocking position with respect to said actuating lever, a solenoid adapted to be energized in response to energization of said drive means to move said blocking lever of the aforesaid blocking position, and locking dog mechanism carried by said lever and spaced from said cam assembly to normally hold said cam assembly captive therebetween to prevent rebound thereof.

References Cited by the Examiner
UNITED STATES PATENTS

| | | | |
|---|---|---|---|
| 2,161,563 | 6/1939 | Doty et al. | 192—40 |
| 2,271,359 | 1/1942 | Zeruneith | 192—33 |
| 2,735,526 | 2/1956 | Gemmel | 192—28 |
| 2,744,600 | 5/1956 | Kohler et al. | 192—148 |

DAVID J. WILLIAMOWSKY, *Primary Examiner.*